United States Patent
Abdel Shahid et al.

(10) Patent No.: US 10,972,968 B2
(45) Date of Patent: Apr. 6, 2021

(54) SELECTING A 5G CELL WITHIN A WIRELESS COMMUNICATION NETWORK

(71) Applicant: T-Mobile USA, Inc., Bellevue, WA (US)

(72) Inventors: Wafik Abdel Shahid, Kenmore, WA (US); Thomas P. Lucht, Seattle, WA (US); Wei-Ming Lan, Morrisville, NC (US); Ming Shan Kwok, Seattle, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 9 days.

(21) Appl. No.: 16/438,992

(22) Filed: Jun. 12, 2019

(65) Prior Publication Data

US 2019/0387464 A1 Dec. 19, 2019

Related U.S. Application Data

(60) Provisional application No. 62/687,158, filed on Jun. 19, 2018.

(51) Int. Cl.
*H04W 84/04* (2009.01)
*H04W 48/00* (2009.01)
(Continued)

(52) U.S. Cl.
CPC ......... *H04W 48/17* (2013.01); *H04W 56/001* (2013.01); *H04W 72/0453* (2013.01); *H04W 84/042* (2013.01)

(58) Field of Classification Search
None
See application file for complete search history.

(56) References Cited

U.S. PATENT DOCUMENTS

2014/0235242 A1   8/2014  Granzow et al.
2015/0358866 A1*  12/2015 Xu ................ H04W 36/0069
                                              370/331

(Continued)

FOREIGN PATENT DOCUMENTS

WO   WO2015002466 A2   1/2015
WO   WO2017164674 A1   9/2017

OTHER PUBLICATIONS

CATT, "Content and Delivery of Minimum SI", 3GPP TSG-RAN WG2 NR Ad Hoc, R2-1700211, Retrieved from: www.3gpp.org-/ftp/TSG_RAN/WG2_RL2/tsgr2_AHs/2017_01_NR/Doc,s/ Jan. 7, 2017, 6 pages.

(Continued)

*Primary Examiner* — Edan Orgad
*Assistant Examiner* — Emmanuel K Maglo
(74) *Attorney, Agent, or Firm* — Lee & Hayes, P.C.

(57) ABSTRACT

Systems and methods discussed herein are directed to selecting and attaching to different cells within wireless communication networks when multiple cells are available. An electronic device determines that a 5G new radio (NR) radio access topology and a non-standalone radio access topology are available within a wireless communication network. The electronic device obtains a bandwidth index for the NR radio access topology and a bandwidth index for the non-standalone radio access topology and compares the two bandwidth indices. Based at least in part on results of the comparison, the electronic device selects one of either (i) the NR radio access topology or (ii) the non-standalone radio access topology and attaches to the selected topology.

10 Claims, 5 Drawing Sheets

(51) Int. Cl.
*H04W 72/04* (2009.01)
*H04W 56/00* (2009.01)

(56) References Cited

U.S. PATENT DOCUMENTS

| | | |
|---|---|---|
| 2017/0111886 A1 | 4/2017 | Kim et al. |
| 2018/0227793 A1* | 8/2018 | Kim .................. H04L 5/0078 |
| 2018/0317114 A1* | 11/2018 | Kim .................. H04L 1/1685 |
| 2018/0317130 A1* | 11/2018 | Jin .................... H04W 28/065 |
| 2018/0359760 A1* | 12/2018 | Su ..................... H04W 72/0453 |
| 2019/0029005 A1* | 1/2019 | Bendlin .............. H04L 5/0053 |
| 2019/0053175 A1* | 2/2019 | Kubota ............... H04W 56/001 |
| 2019/0059024 A1* | 2/2019 | Mufti ................. H04L 65/1016 |
| 2019/0059031 A1* | 2/2019 | Hahn .................. H04W 36/30 |
| 2019/0261258 A1* | 8/2019 | Lindoff ............... H04W 88/06 |
| 2020/0007223 A1* | 1/2020 | Zhu .................... H04B 7/2606 |
| 2020/0177271 A1* | 6/2020 | Ghosh ................. H04W 80/08 |

OTHER PUBLICATIONS

The PCT Search Report and Written Opinion dated Oct. 4, 2019 for PCT Application No. PCT/us2019/036939, 10 pages.

\* cited by examiner

SELECTING A 5G CELL WITHIN A WIRELESS COMMUNICATION NETWORK

CROSS REFERENCE TO RELATED APPLICATIONS

The present disclosure is a nonprovisional application of and claims priority to U.S. Provisional Patent Application No. 62/687,158, filed Jun. 19, 2018, which is incorporated herein by reference.

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile communication devices, such as, for example, smart phones, portable computers, notebooks, laptops, etc., and other types of computing devices, both mobile and stationary, often communicate with other entities, e.g., servers, other similar devices, etc., over the Internet via wireless communication networks.

Wireless communication networks continue to evolve to provide better quality of service and user experience as the number of electronic devices operating within wireless communication networks increases. Thus, there are various operating protocols and operating standards that have been developed, and continue to be developed, for wireless communication networks. For example, there are standards related to third generation (3G), Long Term Evolution (LTE), fourth generation (4G), and fifth generation (5G) operating protocols. Often, electronic devices may be configured as non-standalone devices so that they may operate using different operating protocols within wireless communication networks. For example, an electronic device may be capable of operating according to 3G operating protocols, LTE operating protocols, 4G operating protocols, 5G operating protocols, as well as other operating protocols. Many of the operating protocols have been developed and/or adopted by the Third Generation Partnership Project (3GPP).

Thus, it may be necessary to determine which of the operating protocols provides the better quality of service and/or user experience for an electronic device when it is possible for the electronic device to operate according to multiple operating protocols within a wireless communication network, e.g., it is possible to operate via a cell within the wireless communication network operating in accordance with the LTE operating protocol or via a cell within the wireless communication network operating in accordance with the 5G operating protocol within a wireless communication network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
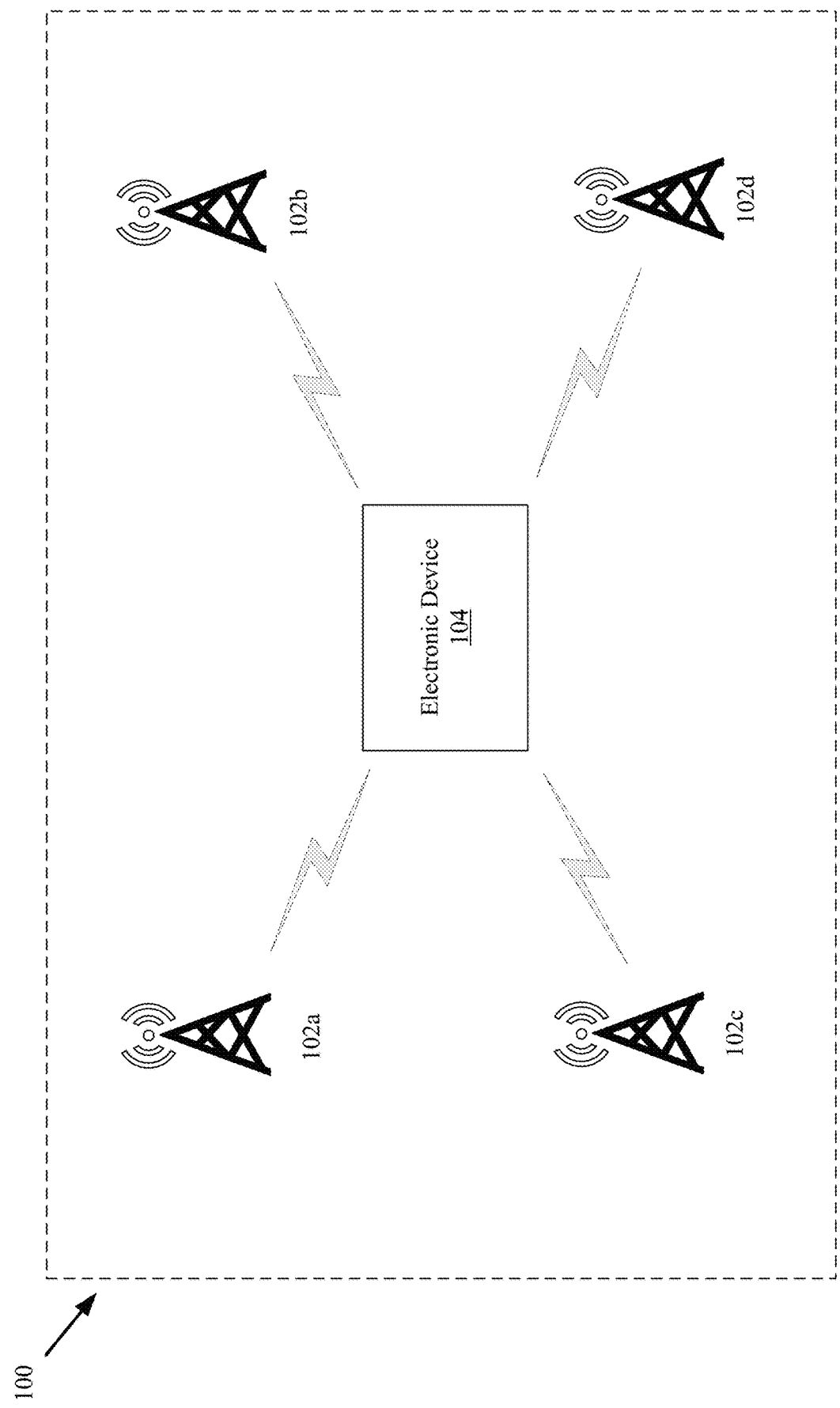
FIG. 1 is a pictorial diagram of a portion of an example wireless communication network that includes multiple cells operating according to different operating protocols, in accordance with various configurations.

Systems and methods discussed herein are directed to selecting and attaching to different cells and/or radios (referred to herein as cells) within wireless communication networks when multiple cells and/or radios are available. The different cells may operate within the wireless communication network according to different operating protocols. The selection of a cell may be based upon available bandwidth for each particular cell.

For example, in configurations, when an electronic device powers up or exits a particular mode of operation, e.g., airplane mode, the electronic device may perform an initial search for a new radio (NR) cell access topology within a wireless communication network, e.g., a cell operating according to fifth generation (5G) operating protocols. The search may include searching for a prioritized band of operation, e.g., n71 band, n66 band, n2 band, millimeter wave (mmw) band, etc. If a 5G cell is found, a synchronization signal block/synchronization process may be performed. System Information Blocks (SIBs) may be read by the electronic device. For example, a SIB2 block may be read to determine if a non-standalone (NSA) radio access topology is available for attaching to another cell or cells operating within the wireless communication network according to another operating protocol, e.g., Long Term Evolution (LTE). For example, the SIB2 block may be read to determine if, for example, Opt3x is available. If the Opt3x is available, the Opt3x bandwidth index may be obtained. Additionally, the Primary cell (Pcell) (in this example, the NR cell) bandwidth index is also obtained.

In configurations, if the Opt3x bandwidth index is less than the Pcell bandwidth, then the electronic device continues with attachment procedures to attach to the 5G cell, e.g., the NR cell. In configurations, as will be discussed herein, there may be a limited number of attempts to determine the availability and/or desirability of a 5G cell.

In configurations, if a 5G cell is not found by the electronic device, then the process may continue by selecting and attaching to other types of cells within the wireless communication network, e.g., cells operating according to a LTE operating protocol. For example, an Evolved Universal Terrestrial Radio Access Network (EUTRAN) cell may be searched for by the electronic device. The band priority in the search may be band 71, 66, 2, or 12. If an EUTRAN cell is found, then the primary synchronization signal (PSS)/secondary synchronization signal (SSS) may be read as well as the SIB2 block. The home public land mobile network (HPLMN) may also be checked and the attach procedure for the EUTRAN cell may be completed. Thus, the electronic device will be EUTRA New Radio (EN)_dual connectivity (DC) configured electronic device in a non-standalone radio access topology, e.g., Opt3x, for operation within the wireless communication network via the EUTRAN cell. Also, in configurations, if the bandwidth index of the found 5G cell is determined to be less than the bandwidth index of the EUTRAN cell, then the electronic device may attach to the EUTRAN cell instead of the 5G cell as described.

In configurations, if an EUTRAN cell and a 5G cell is not found, then the electronic device may search for a Wideband Code Division Multiple Access (WCDMA) Universal Terrestrial Radio Access Network (UTRAN) cell. For example, the electronic device may search for a B4 or a B2 band of operation. If a UTRAN cell is found, then the electronic device may complete the attachment process and operate within the wireless communication network via the WCDMA UTRAN cell.

If no UTRAN cell is found, then the electronic device may search for a Global System for Mobile Communications (GSM) cell operating within the wireless communication network. If a GSM cell is found, then the electronic device may complete the attachment procedure for attaching to the GSM cell and operate within the wireless communication network via the GSM cell.

If, in configurations, a GSM cell is not found, then the electronic device may again search for a NR cell. The process continues as previously described, with the electronic device searching for possible cells within the wireless communication network for operation and comparing bandwidth indices. In configurations, the number of attempts may be limited and monitored by a "retry counter." For example, the electronic device may be limited to only three retry attempts.

FIG. 1 schematically illustrates a portion of an example wireless communication network 100. The wireless communication network 100 includes four cells 102a, 102b, 102c and 102d (which may be referred to herein generally as cells 102). Each cell 102 may be configured to operate according to particular operating protocols. For example, the first cell 102a may include a radio configured to operate according to fifth generation (5G) operating protocols, e.g., new radio (NR) operating protocols. The second cell 102b may be configured to operate according to a Long Term Evolution (LTE) operating protocol such as, for example, Evolved Universal Terrestrial Radio Access Network (EUTRAN). The third cell 102c may be configured to operate according to a third generation (3G) operating protocol such as, for example, a Wideband Code Division Multiple Access (WCDMA) Universal Terrestrial Radio Access Network (UTRAN) operating protocol. Finally, the fourth cell 102d may be configured to operate according to a second generation (2G) operating protocol such as, for example, a Global System for Mobile Communications (GSM) operating protocol.

In the example of FIG. 1, each cell 102 is illustrated as including a separate radio tower or base station. In configurations, the radios for each cell 102 may be co-located in base stations. For example, the 5G radio of cell 102 may be co-located with the EUTRAN radio of cell 102b in a single base station tower. In configurations, a single base station tower may include all four radios for all four cells 102 or may include three radios, two radios or a single radio. While the example wireless communication network portion 100 illustrates four cells 102, there may be more cells 102 or fewer cells 102, depending on the configuration of the wireless communication network 100. Likewise, boundaries for the various cells have not been illustrated since, in many cases, the cells' boundaries overlap with other cells' boundaries.

An electronic device 104 is configured to operate within the wireless communication network 100. In configurations, the electronic device 104 may be configured with capabilities to attach to two or more of the cells 102 within the wireless communication network 100. In configurations, the electronic device 104 is configured to attach to and communicate with each of the four cells 102.

The electronic device 104 may be implemented as any suitable device that may be configured as a "connected device," e.g., an Internet of things (IoT) device, a machine-to-machine (M2M) device, etc. The electronic device 104 may also be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the electronic device 104 as being "mobile" (i.e., configured to be carried and moved around), it is to be appreciated that the electronic device 104 may represent various types of communication devices that are generally stationary as well, such as televisions, appliances, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the electronic device 104 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), 5G, IEEE 802.1x protocols, WiMAX, Wi-Fi, and/or any future IP-based network technology or evolution of an existing IP-based network technology. Thus, the cells 102 may be configured to operate according to such wireless communications/data technologies, protocols, or standards.

Figure 2:
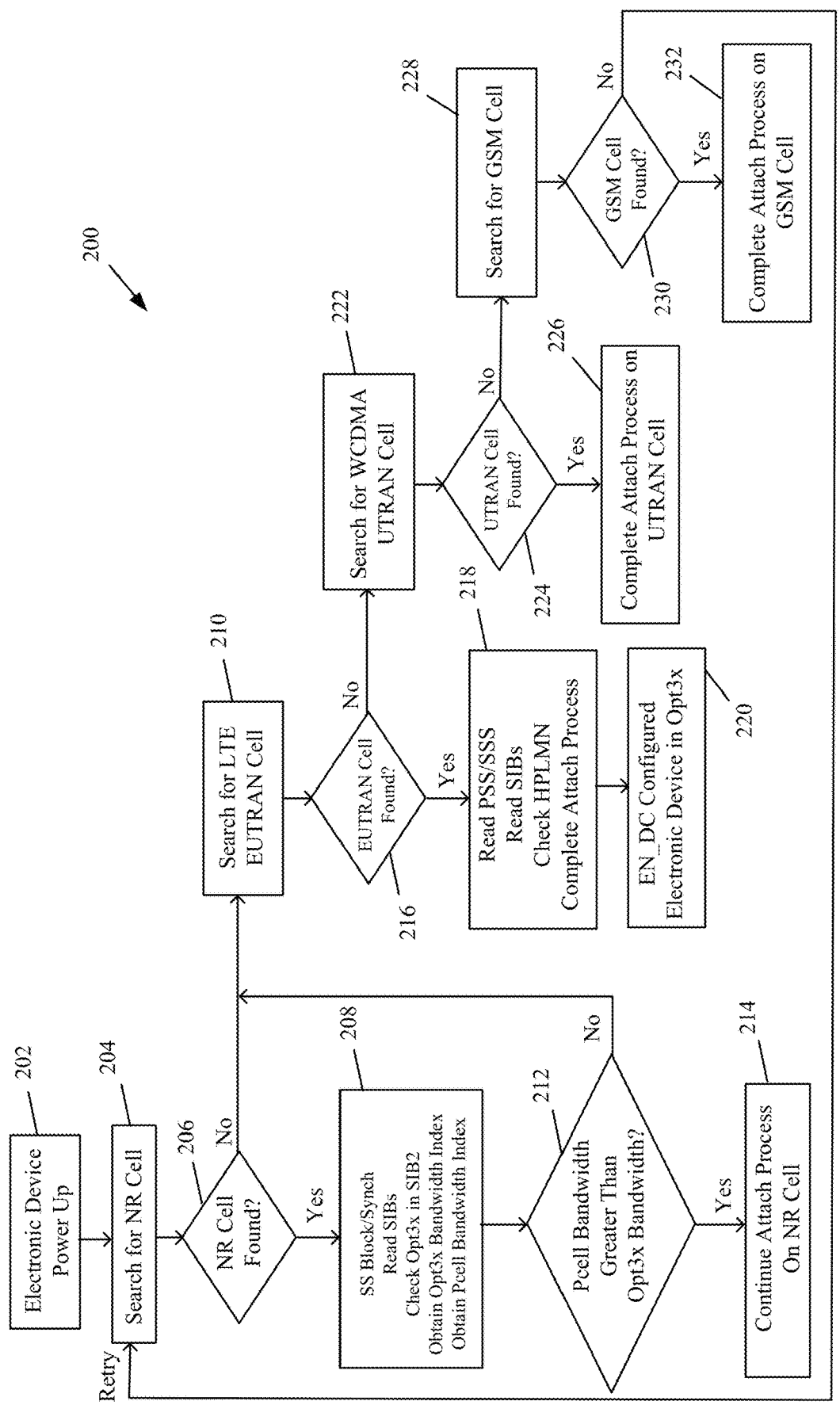
FIG. 2 schematically illustrates an example process for selecting a cell of the wireless communication network of FIG. 1, in accordance with various configurations.

FIG. 2 schematically illustrates an example process 200 for selecting a cell 102 of the wireless communication network 100. At 202, the electronic device 104 powers up or exits a particular mode of operation, e.g., airplane mode. At 204, the electronic device 104 may perform an initial search for a new radio (NR) cell topology within the wireless communication network 100, e.g., the NR cell 102a operating according to 5G operating protocols. The search may include searching for a prioritized band of operation, e.g., n71 band, n66 band, n2 band, millimeter wave (mmw) band, etc.

At block 206, if the electronic device 104 finds that a NR cell, e.g., NR cell 102a, is available, the process 200 proceeds to block 208 where a synchronization signal block/ synchronization process may be performed by the electronic device 104. If no NR cell is found, e.g., the wireless communication network 100 does not include NR cell 102a, the process 200 proceeds to block 210, as will be described further herein.

Additionally, at block 208, system Information Blocks (SIBs) may be read by the electronic device 104. For example, a SIB2 block may be read to determine if a non-standalone (NSA) radio access topology is available for attaching to another cell or cells 102 operating within the wireless communication network 100 according to another operating protocol, e.g., Long Term Evolution (LTE), 3G, 2G, etc. For example, the SIB2 block may be read to determine if, for example, Opt3x is available. If the Opt3x is available, the Opt3x bandwidth index may be obtained, where the Opt3x bandwidth index may be a bandwidth index of another cell 102 operating within the wireless communication network 100, e.g., EUTRAN cell 102b. Additionally, the Primary cell (Pcell) (in this example, the NR cell 102a) bandwidth index is also obtained.

In configurations, at block 212, the electronic device 104 determines if the Pcell bandwidth index is greater than the Opt3x bandwidth index. If the Pcell bandwidth index is greater than the Opt3x bandwidth index, then the process 200 continues to block 214 where the attachment continues and the electronic device 104 continues to attach to the NR cell 102a, e.g., the 5G cell. In configurations, as will be discussed herein, there may be a limited number of attempts to determine the availability and/or desirability of the NR cell 102a. Also, in configurations, other conditions may be included in block 212, as will be discussed further herein.

In configurations, if the NR cell 102a is not found by the electronic device 104 at block 206, then the process 200 may continue at block 210 by selecting and attaching to another type of cell 102 within the wireless communication network. For example, at block 210 the electronic device 104 may search for the EUTRAN cell 102b. The band priority in the search may be 71, 66, 2, or 12. If at block 216 the EUTRAN cell 102b is found, then at block 218 the primary synchronization signal (PSS)/secondary synchronization signal (SSS) may be read as well as the SIB2 block. Additionally, at block 218, the home public land mobile network (HPLMN) may also be checked and the attach procedure for the EUTRAN cell 102b may be completed. As is known, there are generally other steps performed in the attachment process. Thus, at block 220, the electronic device 104 is EUTRA New Radio (EN) dual connectivity (DC) configured electronic device in a non-standalone radio access topology, e.g., Opt3x, for operation within the wireless communication network via the EUTRAN cell 102b. In configurations, at block 212, if the bandwidth index of the found NR cell 102a is less than the bandwidth index of the EUTRAN cell 102b, then the electronic device 104 may attach to the EUTRAN cell 102b instead of the NR cell 102a as just described.

In configurations, if an EUTRAN cell 102b is not found at block 216, then, at block 222, the electronic device 104 may search for a Wideband Code Division Multiple Access (WCDMA) Universal Terrestrial Radio Access Network (UTRAN) cell 102c. For example, the electronic device 104 may search for a B4 or a B2 band of operation. If a UTRAN cell 102c is found at block 224, then the electronic device 104 may complete the attachment process at block 226 and operate within the wireless communication network 100 via the WCDMA UTRAN cell 102c.

If no UTRAN cell 102c is found at block 224, then the electronic device 104 may search for a Global System for Mobile Communications (GSM) cell 102d operating within the wireless communication network 100. If at block 230 a GSM cell 102d is found, then at block 232 the electronic device 104 may complete the attachment process for attaching to the GSM cell 102d and operate within the wireless communication network 100 via the GSM cell 102d.

If at block 230, a GSM cell 102d is not found, then the process 200 may return to block 204 and the electronic device 104 may again search for a NR cell 102a. The process 200 continues as previously described, with the electronic device 104 searching for possible cells 102 within the wireless communication network 100 for operation and comparing bandwidth indices. In configurations, the number of attempts may be limited and monitored by a "retry counter." For example, the electronic device 104 may be limited to only three retry attempts. Thus, each time the process 200 returns to block 204, the retry counter may be decremented by one.

Additionally, as previously noted, in configurations, other factors may be included in the decision-making block 212. For example, if Opt3x is listed in SIB2 as not being available (e.g., Opt3x=0), but the Opt3x bandwidth index is listed as greater than the Pcell bandwidth index, then the process 200 continues with attaching to the NR cell 102a. Also, the process 200 may be limited to a predetermined number of "retrys." Thus, in configurations, the logic of block 212 may be "If (Opt3x==0) && (Opt3x BW Index>Pcell BW index) || (Opt3x==1) && (Opt3x BW Index<Pcell BW index) || RETRY COUNTER==0." If any of the conditions are satisfied, then the process 200 proceeds from block 212 to block 214 as previously described. If none of the conditions are satisfied, then the process 200 proceeds from block 212 to block 210 as previously described. Such logic helps insure that Opt3x is available in SIB2 and that if the bandwidth of Opt3x is greater than the bandwidth of the NR cell 102a, the electronic device 104 will abort the NR cell 102a attach process and search for a LTE cell, e.g., cell 102b, to attach via Opt3x.

Thus, if Opt3x is not available, but Opt3x bandwidth is provided, then the NR cell 102a attach process is continued, and if Opt3x is available and Opt3x bandwidth is less than the 5G cell bandwidth, then the NR cell 102a attach process is continued. The retry counter may be added to avoid the electronic device 104 going into infinite loops in case the electronic device 104 aborts the NR cell 102a attach process to search for a LTE cell, e.g., EUTRAN cell 102b.

In configurations, if Opt3x is available but the LTE cell, e.g., EUTRAN cell 102b, happens to be out of service or the electronic device 104 fails to acquire the LTE Band/Channel for any other reason, the electronic device 104 may be configured to try only one time to attach to the EUTRAN cell 102b and then resume the attachment process on the NR cell 102a even though the bandwidth of the NR cell 102a is smaller than the bandwidth of Opt3x.

Figure 3:
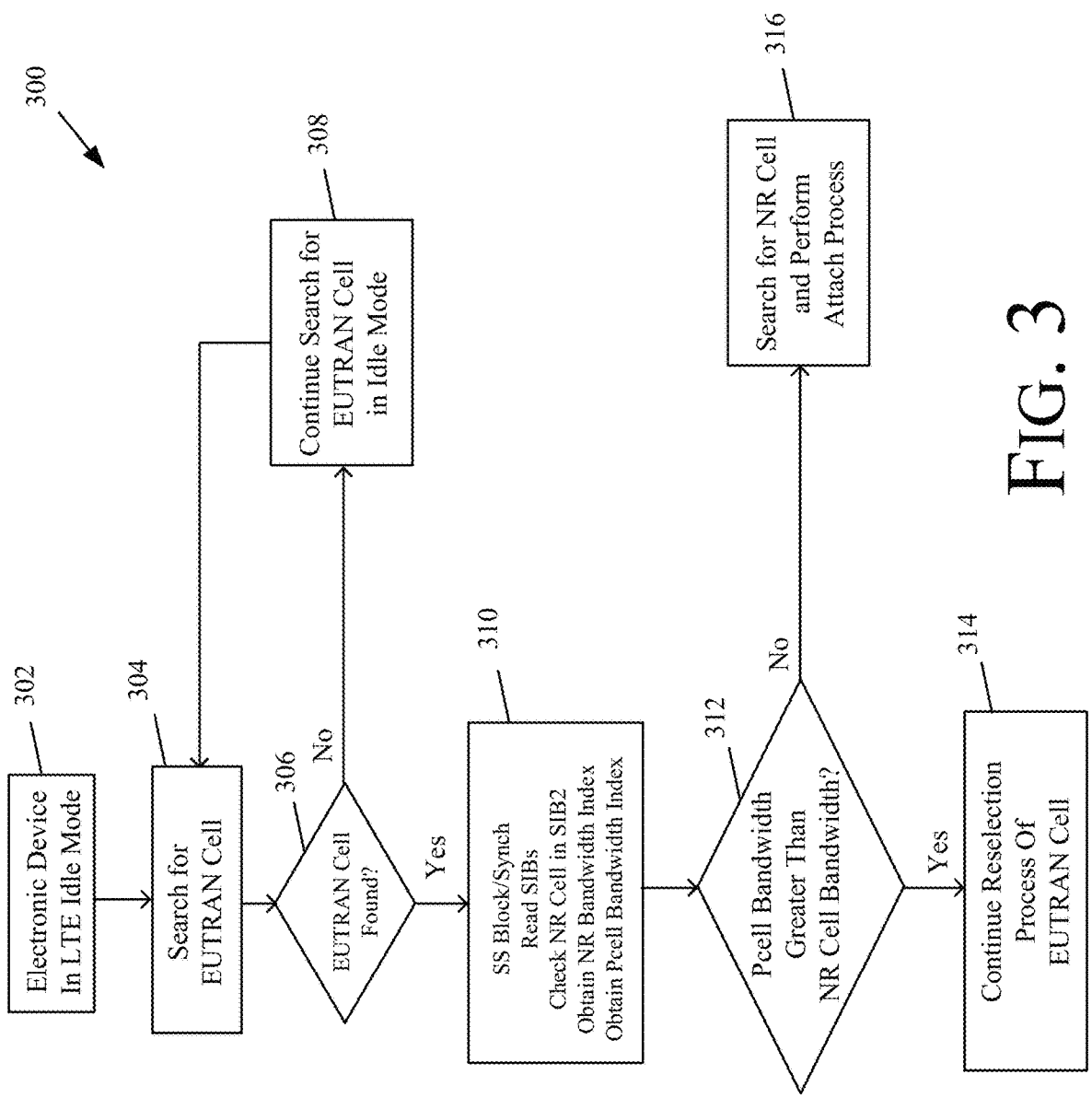
FIG. 3 schematically illustrates an example process for selecting a cell of the wireless communication network of FIG. 1 when an electronic device changes from an idle mode to an active mode, in accordance with various configurations.

FIG. 3 schematically illustrates an example process 300 for selecting a cell 102 of the wireless communication network 100 when the electronic device 104 changes from an idle mode, e.g., a low power mode or "sleeping," to an active mode. In configurations, the electronic device 104 is in a LTE idle mode at block 302. While in the idle mode, at block 304 the electronic device 104 searches for a LTE EUTRAN, e.g., EUTRAN cell 102b. At block 306, the electronic device 104 determines if an EUTRAN cell is found. If an EUTRAN cell has not been found at block 306, the process 300 continues to block 308, where the electronic device 104 continues to search for a LTE EUTRAN cell while in the idle mode.

At block 310, if an EUTRAN cell has been found at block 306, the electronic device 104 performs a synchronization signal block/synchronization process. Additionally, at block 310, system Information Blocks (SIBs) may be read by the electronic device 104. For example, a SIB2 block may be read to determine if a NR access topology is available (i.e. upperLayerindication-r15 information element) for attaching to a NR cell, e.g., NR cell 102a. If the NR cell is available (NR=1), the NR cell bandwidth index may be obtained. Additionally, the Primary cell (Pcell) (in this example, the EUTRAN cell) bandwidth index is also obtained.

In configurations, at block 312, the electronic device 104 determines if the Pcell bandwidth index is greater than the NR cell bandwidth index. If the Pcell bandwidth index is greater than the NR cell bandwidth index, then the electronic device 104 continues at block 314 with the reselection process to attach (or remain attached) to the EUTRAN cell, e.g., EUTRAN cell 102b. Additionally, if the NR cell is not available (NR=0), then the electronic device 104 continues at block 314 with the reselection process to attach (or remain attached) to the EUTRAN cell, e.g., EUTRAN cell 102b. If at block 312 it is determined that the Pcell bandwidth index is not greater than the NR cell bandwidth index, then, at block 316, the electronic device 104 searches for a NR cell, e.g., cell 102a, and performs an attach process for the NR cell.

Thus, the logic of block 312 may be "If (NR==0) && (NR BW Index>Pcell BW index) || (NR==1) && (NR BW Index<Pcell BW index). If either of the conditions are satisfied, then the process 300 continues from block 312 to block 314. If neither condition is satisfied, then the process 300 continues from block 312 to block 316.

Figure 4:
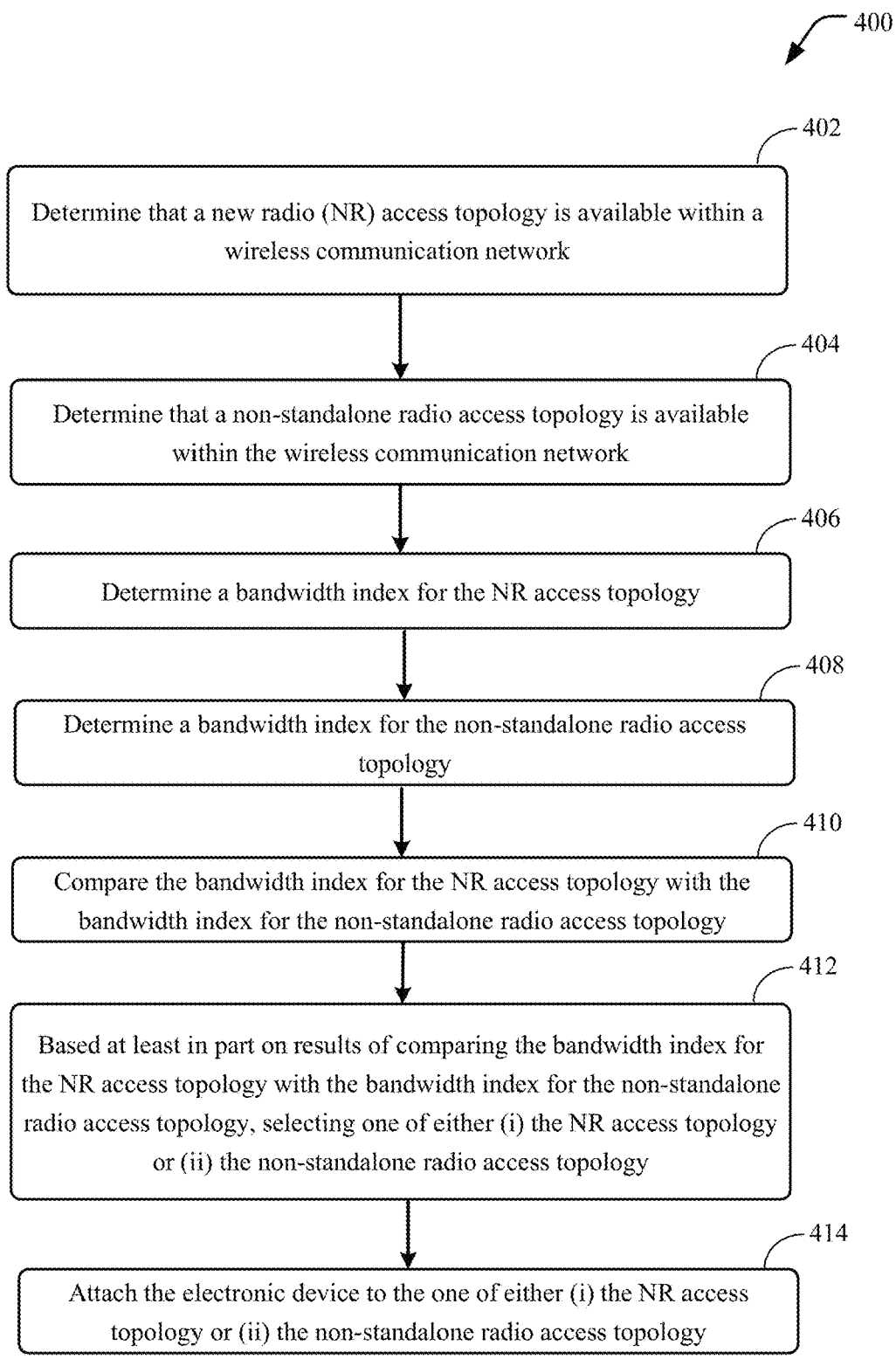
FIG. 4 is a flow diagram of an example process for an electronic device, e.g., an electronic device within the wireless communication network of FIG. 1, to select a cell, in accordance with various configurations.

FIG. 4 is a flow diagram of an illustrative process that may be implemented within or in association with the arrangements and processes of FIGS. 1-3. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 4 is a flow diagram illustrating an example process 400 for an electronic device, e.g., electronic device 104, to select a cell, e.g., a cell 102, of a wireless communication network, e.g., the wireless communication network 100. At block 402, a new radio (NR) radio access topology is determined to be available within the wireless communication network. At block 404, a non-standalone radio access topology is determined to be available within the wireless communication network. At block 406, a bandwidth index for the NR access topology is determined. At block 408, a bandwidth index for the non-standalone radio access topology is determined.

At block 410, the bandwidth index for the NR access topology is compared with the bandwidth index for the non-standalone radio access topology. At block 412, based at least in part on results of comparing the bandwidth index for the NR access topology with the bandwidth index for the non-standalone radio access topology, one of either (i) the NR access topology or (ii) the non-standalone radio access topology is selected. At block 414, the electronic device attaches to the one of either (i) the NR access topology or (ii) the non-standalone radio access topology.

Figure 5:
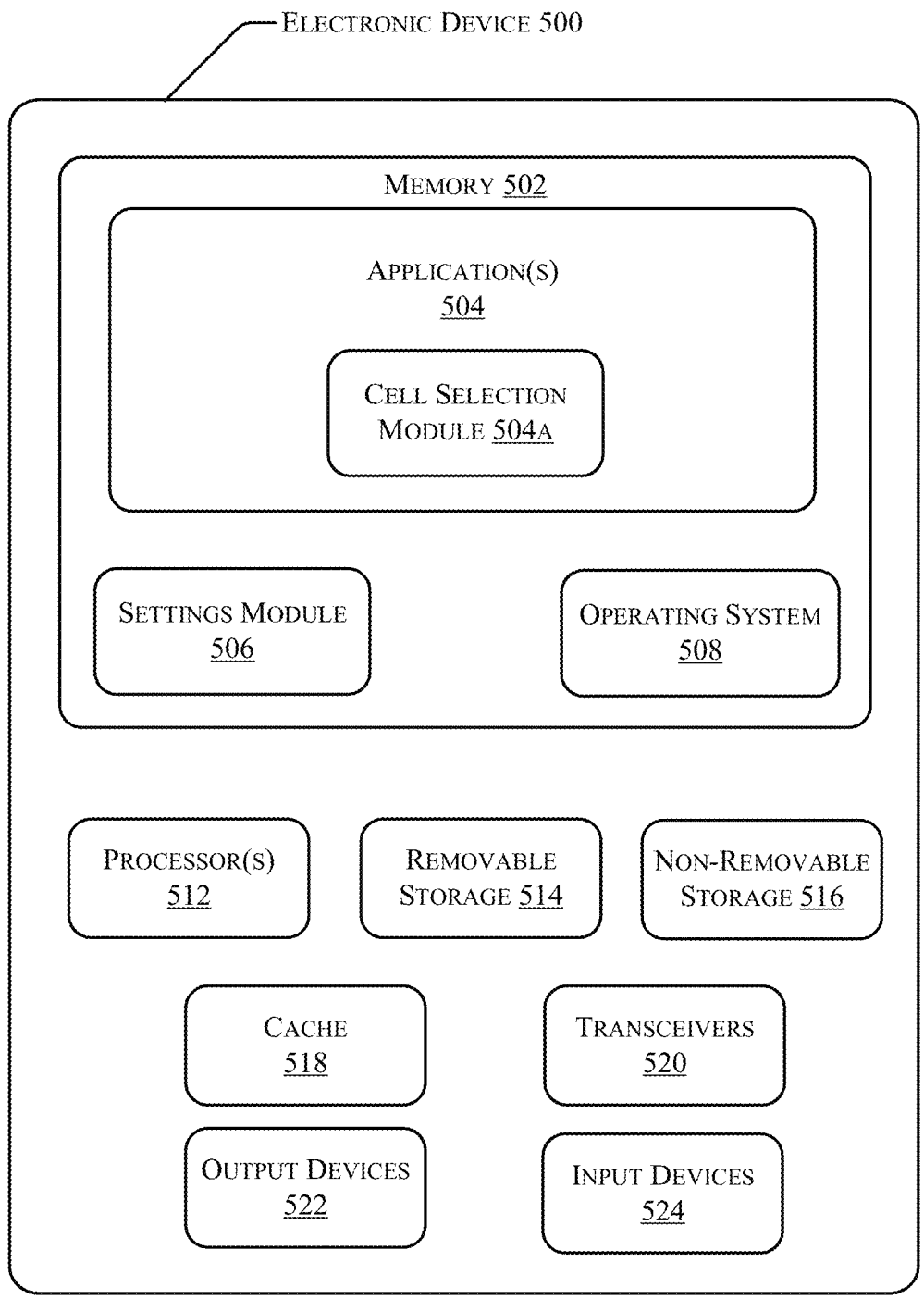
FIG. 5 schematically illustrates a component level view of an example electronic device configured for use in the wireless communication network of FIG. 1, in accordance with various configurations.

FIG. 5 schematically illustrates a component level view of an example electronic device 500, such as electronic device 104, configured to function within wireless communication network 100. The electronic device 500 may include more or less components depending on the type of electronic device. As illustrated, the electronic device 500 comprises a system memory 502, e.g., computer-readable media, storing application(s) 504. The mobile device also comprises a settings module 506, and an operating system 508. Also, the electronic device 500 includes processor(s) 512, a removable storage 514, a non-removable storage 516, cache 518, transceivers 520, output device(s) 522, and input device(s) 524. In various implementations, system memory 502 is volatile (such as RAM), non-volatile (such as ROM, flash memory, etc.) or some combination of the two. In some implementations, the processor(s) 512 is a central processing unit (CPU), a graphics processing unit (GPU), or both CPU and GPU, or any other sort of processing unit. The applications 504 may include a cell selection application 504a that, when executed by the processor(s) 512, may cause the processor(s) 512 to perform various tasks and processes as described with respect to FIGS. 1-4.

The electronic device 500 may also include additional data storage devices (removable and/or non-removable) such as, for example, magnetic disks, optical disks, or tape. Such additional data storage may include removable storage 514 and non-removable storage 516. Additionally, the electronic device 500 includes cache 518.

Non-transitory computer-readable media may include volatile and nonvolatile, removable and non-removable tangible, physical media implemented in technology for storage of information, such as computer readable instructions, data structures, program modules, or other data. System memory 502, removable storage 514, non-removable storage 516 and cache 518 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 500. Any such non-transitory computer-readable media may be part of the electronic device 500. The processor(s) 512 may be configured to execute instructions, which may be stored in the non-transitory computer-readable media or in other computer-readable media accessible to the processor(s) 512.

In some implementations, the transceivers 520 include any sort of transceivers known in the art. For example, the transceivers 520 may include a radio transceiver that performs the function of transmitting and receiving radio frequency communications via an antenna (not shown). Also, or alternatively, the transceivers 520 may include wireless modem(s) to facilitate wireless connectivity with other computing devices. Further, the transceivers 520 may include wired communication components, such as an Ethernet port, for communicating with other networked devices.

In some implementations, the output devices 522 include any sort of output devices known in the art, such as a display (e.g., a liquid crystal display), speakers, a vibrating mechanism, or a tactile feedback mechanism. Output devices 522 also include ports for one or more peripheral devices, such as headphones, peripheral speakers, or a peripheral display.

In various implementations, input devices 524 include any sort of input devices known in the art. For example, input devices 524 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 524 may be used to enter preferences of a user of the electronic device 500 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 502 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more processors of an electronic device, the method comprising:
    determining that a new radio (NR) access topology is available within a wireless communication network;
    determining that a non-standalone radio access topology is available within the wireless communication network, wherein determining that the non-standalone radio access topology is available within the wireless communication network comprises:
    synchronizing with a synchronization signal block;
    reading one or more system information blocks; and
    checking at least one of the one or more system information blocks for availability of the non-standalone radio access topology;
    determining a bandwidth index for the NR access topology;
    determining a bandwidth index for the non-standalone radio access topology;
    comparing the bandwidth index for the NR access topology with the bandwidth index for the non-standalone radio access topology;
    based at least in part on results of comparing the bandwidth index for the NR access topology with the bandwidth index for the non-standalone radio access topology, selecting the non-standalone radio access topology;
    determining that an Evolved Universal Terrestrial Radio Access Network (EUTRAN) cell is not available within the wireless communication network;
    determining that a Wideband Code Division Multiple Access (WCDMA) Universal Terrestrial Radio Access Network (UTRAN) cell is available within the wireless communication network; and
    attaching the electronic device to the WCDMA UTRAN cell.

2. The method of claim 1, wherein the electronic device comprises one of an electronic device configured as a smart device, an electronic device configured as an Internet of things (IoT) device, or an electronic device configured as a machine-to-machine (M2M) device.

3. An apparatus configured for operation within a wireless communication network, the apparatus comprising:
    one or more processors; and a non-transitory storage medium comprising instructions stored thereon, the instructions being executable by the one or more processors to:
  determine that a new radio (NR) access topology is available within the wireless communication network;
  determine that a non-standalone radio access topology is available within the wireless communication network, wherein determine that the non-standalone radio access topology is available within the wireless communication network comprises:
  synchronizing with a synchronization signal block;
  reading one or more system information blocks; and
  checking at least one of the one or more system information blocks for availability of the non-standalone radio access topology;
  determine a bandwidth index for the NR access topology;
  determine a bandwidth index for the non-standalone radio access topology;
  compare the bandwidth index for the NR access topology with the bandwidth index for the non-standalone radio access topology;
  based at least in part on results of compare the bandwidth index for the NR access topology with the bandwidth index for the non-standalone radio access topology, select one of either (i) the NR access topology or (ii) the non-standalone radio access topology; and attach the apparatus to the one of either (i) the NR access topology or (ii) the non-standalone radio access topology
  determine that an Evolved Universal Terrestrial Radio Access Network (EUTRAN) cell is not available within the wireless communication network;
  determine that a Wideband Code Division Multiple Access (WCDMA) Universal Terrestrial Radio Access Network (UTRAN) cell is available within the wireless communication network; and
  attach the apparatus to the WCDMA UTRAN cell.

4. The apparatus of claim 3, wherein the apparatus comprises one of an electronic device configured as a smart device, an electronic device configured as an Internet of things (IoT) device, or an electronic device configured as a machine-to-machine (M2M) device.

5. A non-transitory storage medium included within an electronic device and comprising instructions stored thereon, the instructions being executable by one or more processors to:
  determine that a new radio (NR) access topology is available within a wireless communication network;
  determine that a non-standalone radio access topology is available within the wireless communication network, wherein determine that the non-standalone radio access topology is available within the wireless communication network comprises:
  synchronizing with a synchronization signal block;
  reading one or more system information blocks; and
  checking at least one of the one or more system information blocks for availability of the non-standalone radio access topology;
  determine a bandwidth index for the NR access topology;
  determine a bandwidth index for the non-standalone radio access topology;
  compare the bandwidth index for the NR access topology with the bandwidth index for the non-standalone radio access topology;
  based at least in part on results of compare the bandwidth index for the NR access topology with the bandwidth index for the non-standalone radio access topology, select one of either (i) the NR access topology or (ii) the non-standalone radio access topology;
  determine that an Evolved Universal Terrestrial Radio Access Network (EUTRAN) cell is not available within the wireless communication network;
  determine that a Wideband Code Division Multiple Access (WCDMA) Universal Terrestrial Radio Access Network (UTRAN) cell is available within the wireless communication network; and
  attach the electronic device to the WCDMA UTRAN cell.

6. The non-transitory storage medium of claim 5, wherein the electronic device comprises one of an electronic device configured as a smart device, an electronic device configured as an Internet of things (IoT) device, or an electronic device configured as a machine-to-machine (M2M) device.

7. A method performed by one or more processors of an electronic device, the method comprising:
  determining that a new radio (NR) access topology is available within a wireless communication network;
  determining that a non-standalone radio access topology is available within the wireless communication network, wherein determining that the non-standalone radio access topology is available within the wireless communication network comprises:
  synchronizing with a synchronization signal block;
  reading one or more system information blocks; and
  checking at least one of the one or more system information blocks for availability of the non-standalone radio access topology;
  determining a bandwidth index for the NR access topology;
  determining a bandwidth index for the non-standalone radio access topology;
  comparing the bandwidth index for the NR access topology with the bandwidth index for the non-standalone radio access topology;
  based at least in part on results of comparing the bandwidth index for the NR access topology with the bandwidth index for the non-standalone radio access topology, selecting the non-standalone radio access topology;
  determining that an Evolved Universal Terrestrial Radio Access Network (EUTRAN) cell is not available within the wireless communication network;
  determining that a Wideband Code Division Multiple Access (WCDMA) Universal Terrestrial Radio Access Network (UTRAN) cell is not available within the wireless communication network;
  determining that a Global System for Mobile Communications (GSM) cell is available within the wireless communication network; and
  attaching the electronic device to the GSM cell.

8. The method of claim 7, wherein the electronic device comprises one of an electronic device configured as a smart device, an electronic device configured as an Internet of things (IoT) device, or an electronic device configured as a machine-to-machine (M2M) device.

9. An apparatus configured for operation within a wireless communication network, the apparatus comprising:
  one or more processors; and
  a non-transitory storage medium comprising instructions stored thereon, the instructions being executable by the one or more processors to:

determine that a new radio (NR) access topology is available within the wireless communication network;

determine that a non-standalone radio access topology is available within the wireless communication network, wherein determining that the non-standalone radio access topology is available within the wireless communication network comprises:

synchronizing with a synchronization signal block;

reading one or more system information blocks; and checking at least one of the one or more system information blocks for availability of the non-standalone radio access topology;

determine a bandwidth index for the NR access topology;

determine a bandwidth index for the non-standalone radio access topology;

compare the bandwidth index for the NR access topology with the bandwidth index for the non-standalone radio access topology;

based at least in part on results of compare the bandwidth index for the NR access topology with the bandwidth index for the non-standalone radio access topology, select the non-standalone radio access topology;

determine that an Evolved Universal Terrestrial Radio Access Network (EUTRAN) cell is not available within the wireless communication network;

determine that a Wideband Code Division Multiple Access (WCDMA) Universal Terrestrial Radio Access Network (UTRAN) cell is not available within the wireless communication network;

determine that a Global System for Mobile Communications (GSM) cell is available within the wireless communication network; and attach the apparatus to the GSM cell.

10. The apparatus of claim 9, wherein the apparatus comprises one of an electronic device configured as a smart device, an electronic device configured as an Internet of things (IoT) device, or an electronic device configured as a machine-to-machine (M2M) device.

* * * * *